L. Kirk,
Drag Saw.

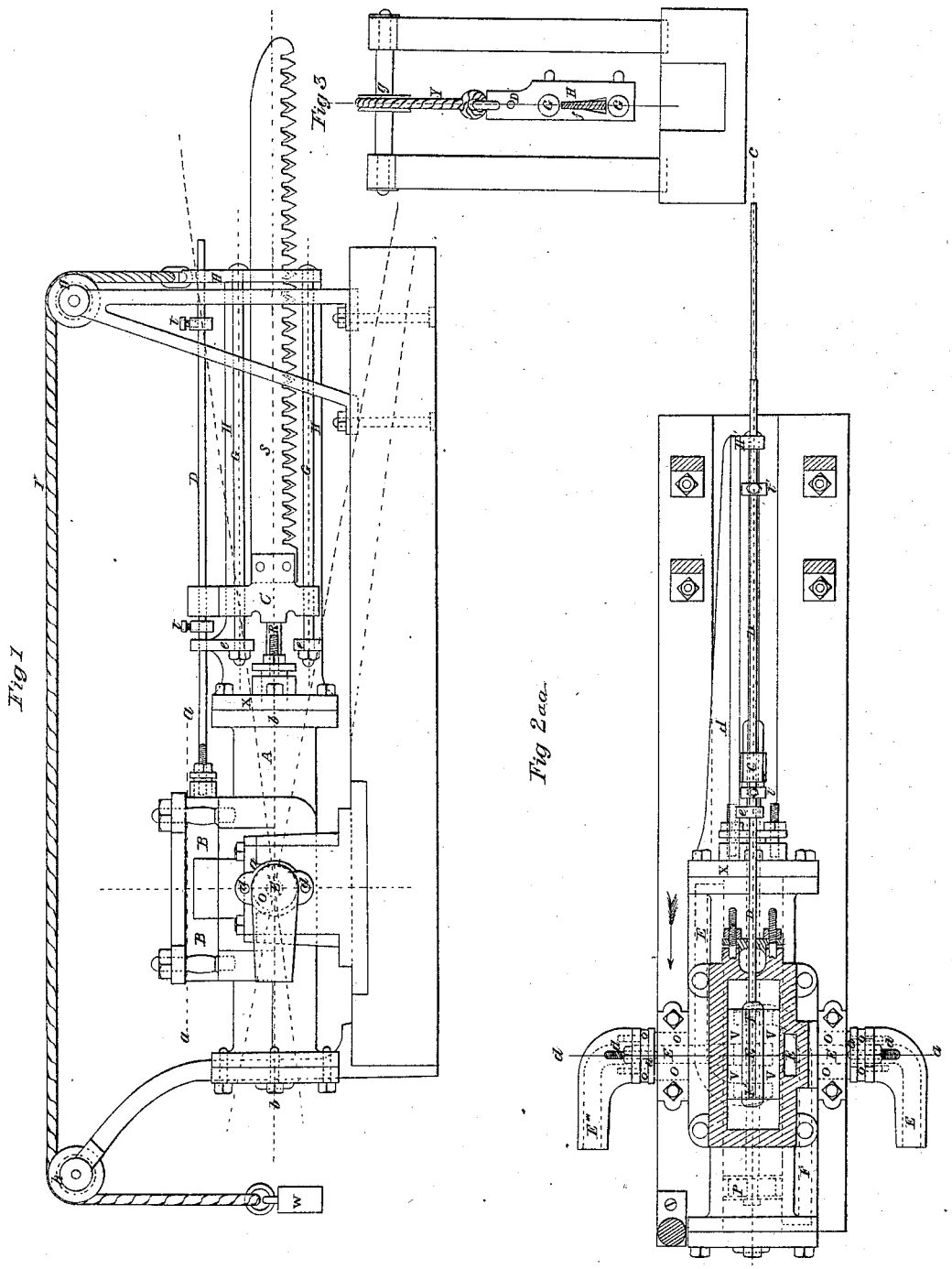
L. Kirk,
Drag Saw.
Nº 5,040.
Patented Mar. 27, 1847.
2 Sheets—Sheet 1.

No. 5,040. Patented Mar. 27, 1847.

UNITED STATES PATENT OFFICE.

LEWIS KIRK, OF READING, PENNSYLVANIA.

CROSSCUT STEAM-SAW.

Specification of Letters Patent No. 5,040, dated March 27, 1847.

*To all whom it may concern:*

Be it known that I, LEWIS KIRK, of Reading, in the county of Berks and State of Pennsylvania, have invented a new and useful Steam Crosscut-Saw for Sawing Wood, and that the following is a full, clear, and exact description of the principle or character which distinguishes it from all other things before known and of the manner of making, constructing, and using the same, reference being had to the accompanying drawings, making part of this specification, in which—

Figure 4:
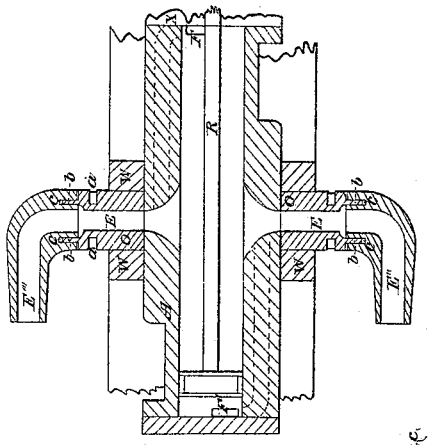
Figure 6:
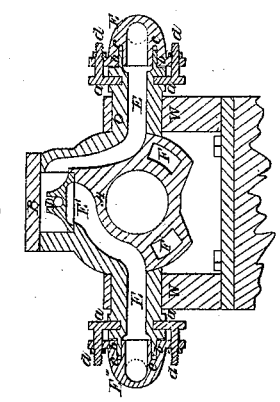
Figure 5:
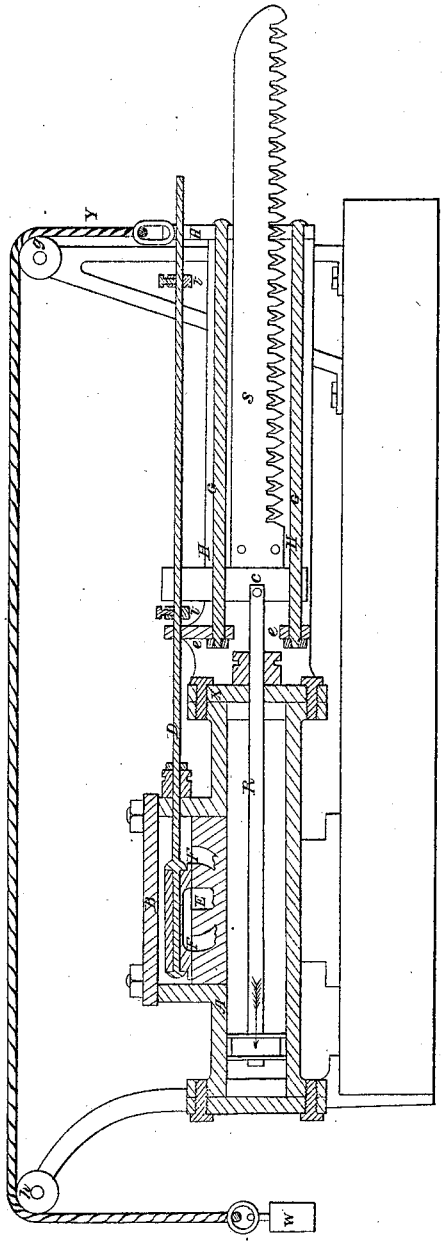

Figure 1 is an elevation; Fig. 2, a horizontal section at the line ($a$, $a$) of Fig. 1; Fig. 3, an end elevation; Fig. 4, a horizontal section at the line ($b$, $b$) of Fig. 1; Fig. 5, a longitudinal vertical section at the line ($c$, $c$) of Fig. 2; and Fig. 6, a cross vertical section taken at the line ($d$, $d$) of the same figure.

The same letters indicate like parts in all the figures.

The nature of my invention consists in attaching a cross cut saw to the cross head of a steam engine hung on trunnions in a frame, the ways on which the cross head slides being attached to the head of the cylinder, and the saw passing through a guide at the end of the ways, so that by this arrangement the saw is operated directly by the piston rod, and is at liberty to move down through the log as it cuts, in consequence of having the engine hung on trunnions.

My invention also consists in reversing the direction of the steam ways that connect the steam chest with the ends of the cylinders, in combination with the two tappets on the valve rods which are struck by the cross head to shift the valve toward the end of each stroke, by means of which arrangement I am enabled to dispense with the rock shaft heretofore employed in all engines which operate the valves by the direct reciprocating motion of the piston. And finally my invention consists in coupling the trunnions of the cylinder, (which are hollow for the introduction and escape of the steam) with the steam and exhaust pipes by having a cylindrical fillet on the end of each trunnion fitted to an annular cylindrical groove in the end of the steam and exhaust pipe so that by putting packing in this groove it can be forced up against the end of the fillet to make a steam tight turning joint by means of coupling screws which pass through the flanch of the pipe and a collar that turns in a groove cut in that part of the periphery of the trunnion which projects beyond the boxes in which it turns.

In the accompanying drawings (A) represents a steam cylinder with trunnions ($o$, $o$) at the sides which are hung in boxes in the standards (W, W) of an appropriate frame. These trunnions are hollow as shown at (E) and (E'), one for the admission and the other for the escape of steam, and to form the connection between the steam chest (B) attached to the cylinder and the steam and exhaust pipes (E'') and (E'''); and these two pipes are coupled with the trunnions, to admit of the vibration of the engine without interrupting the introduction or escape of steam, in the manner represented in Fig. 4 which is a horizontal section taken through the axis of one of the trunnions, the two being alike. A groove is turned in the trunnion to receive a collar ($a$) and at the end there is also turned a cylindrical fillet ($b$) which fits in an annular cylindrical groove in the end of the steam pipe, so that by inserting packing ($c$) in the bottom of the annular groove and drawing up the steam pipe by means of coupling screws ($d$, $d$) which pass through the collar ($a$) and the flanch of the steam pipe, the end of the fillet ($b$) is forced against the packing which forms a steam tight joint that will admit of the vibration of the cylinder. The steam way (E) from the steam pipe passes through the trunnion and then up to and through the side of the steam chest, and the two steam ports (F, F'), run down by curved lines to the steam channels (indicated by the same letters) in the sides of the steam cylinder, the port (F') which is toward the head end of the cylinder communicating with the rear end of the cylinder, and vice versa. And the exhaust port (E') is situated between the two steam ports and runs down in a curve to and through the hollow trunnions (F'). The usual D valve is used, having a valve rod (D) that passes through a stuffing box in the end of the steam chest. The head (X) of the cylinder, through which the piston rod (R) passes is cast with two bars (H, H) parallel with each other and with the axis of the cylinder—they are connected together by a cross bar (H') at their outer end and are provided with projecting brackets (e, e) near the head of the cylinder, and to these brackets and the cross bar (H') are attached two round rods (G, G) which constitute the ways on which the cross head (C) of the piston rod slides. To this cross head is securely bolted a cross cut saw (S) which passes through a hole in a guide (f) in the cross bar (H') the hole being enlarged toward the bottom to prevent the striking of the teeth as the saw moves through it. This guide supports the saw near to where it acts on the log that is being cut instead of depending entirely on the stiffness of the saw. The cross head extends sufficiently high to slide on the valve rod (D) the outer end of which slides through the cross bar (H'), and it has on it two tappets (t) and (t') so that as the cross head is carried by the piston toward the end of each stroke it strikes one of these tappets to shift the valve, and by the reversed arrangement of the steam ways in the cylinder the action of the piston is reversed, as for instance, when the piston moves in the direction of the arrow at the end of this stroke it opens the port (F') which is toward the head of the cylinder, and if the steam ways were not reversed the steam would be admitted at that end of the cylinder from which the piston has been moving, but as the steam ways are reversed it admits the steam at the back end of the cylinder, and thereby reverses the motion of the piston without the necessity of an intermediate rock shaft as heretofore used, and so at the end of the other stroke, each time the (D) slide valve opening the communication between the steam port that has been closed and the exhaust port in the usual manner.

To the upper end of the cross bar (H') there is attached a cord or chain (Y) which passes over a pulley (g) at that end of the machine, and over another (h) at the other end and then has a counter weight (W') suspended to it to nearly balance the surplus weight of the mechanism on the forward end of the engine, leaving enough preponderance to carry the saw through the log. By this means the saw feeds itself and when the cut is completed the attendant can lift the saw up by the cord or chain to commence another cut. The vibration of the engine on its trunnions does not affect the introduction or escape of the steam, as in other vibrating engines, this being effected by the slide valve in the manner described.

The logs to be cut are placed on a cross carriage and clamped in any desired manner.

What I claim as my invention and desire to secure by Letters Patent is—

Combining with a steam engine that is hung on trunnions to admit of its vibration, as herein described, a cross cut saw attached to the cross head of the piston rod, as described, whereby the saw can receive its longitudinal motions to cut, and an up and down motion to pass through the log as it is cut and to be lifted up preparatory to another cut, substantially as described.

LEWIS KIRK.

Witnesses:
C. W. M. KELLER,
A. P. BROWNE.